United States Patent [19]

Stevenson et al.

[11] Patent Number: 5,254,635

[45] Date of Patent: Oct. 19, 1993

[54] RUBBER COMPOSITION CONTAINING DIBENZYL THIURAM SULFIDE

[75] Inventors: Arthur Stevenson, West Bromwich; Ranvir S. Virdi, Handsworth Wood, both of England

[73] Assignee: Robinson Brothers Limited, West Bromwich, England

[21] Appl. No.: 566,838

[22] Filed: Aug. 13, 1990

[30] Foreign Application Priority Data

Aug. 18, 1989 [GB] United Kingdom ............... 8918890.8
Nov. 10, 1989 [GB] United Kingdom ............... 8925415.5

[51] Int. Cl.$^5$ ...................... C08C 19/22; C08C 19/20
[52] U.S. Cl. ............................... 525/332.7; 525/331.1; 525/331.8
[58] Field of Search ............... 525/332.5, 332.6, 332.7, 525/331.1, 331.8

[56] References Cited

U.S. PATENT DOCUMENTS 1,634,924  7/1927  Whitby .
2,374,385  4/1945  Sauser .
2,453,689  11/1948  Beaver .
4,695,609  9/1987  Stevenson ........................... 525/352

FOREIGN PATENT DOCUMENTS 0184301  6/1986  European Pat. Off. .
0283552  9/1988  European Pat. Off. .
0284649  10/1988  European Pat. Off. .
0284650  10/1988  European Pat. Off. .

OTHER PUBLICATIONS

Perkacit DP-TB$_2$TD by AKZO (excerpts).
Seeberger, D. B., A New Safe Thiuram TB$_2$TD, 1989 Oct. (excerpts).
EPO Search Report of May 15, 1990 in U.K. Patent Application 8918890.

Primary Examiner—Christopher Henderson
Attorney, Agent, or Firm—Parmelee, Bollinger & Bramblett

[57] ABSTRACT

A dibenzylthiuram sulphide such as tetrabenzylthiuram disulphide is combined with a dihydrocarbyl xanthogen polysulphide and/or a xanthate to provide a composition which has good properties as an accelerator in rubber vulcanisation, without providing harmful nitrosatables.

8 Claims, No Drawings

RUBBER COMPOSITION CONTAINING DIBENZYL THIURAM SULFIDE

The present invention relates to new rubber products and to systems for use in curing rubber.

Commercial rubber goods generally include nitrogen-containing materials which are used as, or formed from, curing or accelerating agents.

Dithiocarbamates, e.g. of the formula $(R_aR_bN\text{-}CSS)_yM$, and thiuram sulphides, e.g. of the formula $R_1R_bN\text{-}CS\text{-}S_z\text{-}CS\text{-}NR_aR_b$, in which y and z are each integers, $R_a$ and $R_b$ are each aryl, alkyl or substituted alkyl and M is a metal such as sodium or zinc, are widely used as accelerators and curing agents for rubber goods. N-nitrosamines of the formula $R_aR_bNNO$ are known to be present in, and formed from, corresponding dithiocarbamates and thiuram sulphides Other N-containing compounds used in rubber processing, e.g. sulphenamides and thioureas, can also give N-nitrosamines (hereinafter referred to simply as "nitrosamines").

EPDM (ethylene-propylene-diene-modified) rubber is conventionally cured using a combination of dipentamethylenethiuram hexasulphide, tetramethylthiuram disulphide (TMTD) and tellurium diethyldithiocarbamate. Neoprene is conventionally cured using zinc oxide activated with a thiourea (e.g. ethylenethiourea or diethylthiourea) or a tertiary amine (e.g. hexamethylenetetramine). The given N-containing activators/curing agents are all nitrosatables.

Nitrosamines are recognised to be carcinogenic in animals, birds and fish. Among those nitrosamines tested, only those with exceptional structures, e.g. where $R_a$ or $R_b$ is a tertiary group, or $R_a$ and $R_b$ are each benzyl, have been found to lack carcinogenic activity; see Druckrey et al, Zeitschrift fuer Krebsforschung 69 (1967) 103-201 and Lijins et al, J. Nat. Cancer Inst. 49 (1972) 1329-1249. Nitrosamines in which $R_a$ and $R_b$ are each methyl, ethyl, propyl or butyl groups, or $R_a$ and $R_b$ together represent the pentamethylene group, are particularly potent.

Nitrosamines are of potential danger wherever they can come into contact with foodstuffs or sensitive skin, or wherever they can build up in a closed atmosphere, e.g. in underwater environments, diving gear or parked cars. There is a risk of exposure to nitrosamines during the manufacture of dithiocarbamates and related compounds, and during their use in manufacturing rubber goods. The presence of nitrosamines in rubber goods is potentially of risk to humans.

Rubber of the type used for baby teats and soothers typically has a nitrosamine content of about 0.5 ppm. Very careful formulation and washing is needed to reduce this concentration to an acceptable level for babies, i.e. below 0.01 ppm. However, because dithiocarbamate accelerators and related compounds are usually used in amounts of up to 1% by weight of rubber, there remains, after curing and washing, a substantial residue of N-containing material capable of nitrosation by nitrite in saliva.

The attention paid to TMTD in rubber vulcanisation probably outweighs that paid to any other accelerator, mainly because TMTD will vulcanise elastomers without additional elemental sulphur When used as a vulcanising agent in rubbers, it imparts a high resistance to thermal ageing. TMTD is regarded as the most active of the thiurams (including TMT monosulphide) but gives adverse effects in working environments.

The BRMA Code of Practice for Toxicity and Safe Handling of Rubber Chemicals (1985) reported that prolonged exposure to TMTD has been associated with the development of chronic conjunctivitis, although TMTD is not regarded as an acute eye irritant. It reacts with nitrite to produce carcinogenic N-nitrosodimethylamine and is known to be most toxic of the thiurams. If absorbed by humans before or after consumption of alcohol it can give rise to unpleasant side-effects (for example vomiting, flushing, etc). It is also listed by the International Contact Dermatitis Group for routine skin patch testing in appropriate circumstances.

An effective, safe substitute for TMTD is required. A relatively harmless compound, such as a tetrabenzylthiuram sulphide (hereinafter "TBS"), is generally a poor accelerator (see Example 2, below). A TBS may also bloom, although tetrabenzylthiuram disulphide and tetrabenzylthiuram tetrasulphide have variously been proposed as vulcanisation accelerators and for hindering bloom, in EP-A-0283552, EP-A-0284649 and EP-A-0284650.

U.S. Pat. No. 1,634,924, U.S. Pat. No. 2,374,385 and U.S. Pat. No. 2,453,689 each disclose the use of dihydrocarbyl xanthogen polysulphides as accelerators in rubber compositions. For best results, a nitrosatable component is also present. In a single instance in U.S. Pat No. 1634924 (Example VIII), no amine is used, but the state of cure is relatively very poor. In U.S. Pat. No. 2453689, the highest recorded tensile strength is 2700 lb/in$^2$ (18.6 MPa). This is insufficient for practical utility. Perhaps for this reason, xanthogen polysulphides appear not to have been used on any commercial scale, over the last 50 years.

Xanthogen disulphides are used as chain-length modifiers in, for example, emulsion polymerisation processes, and have been proposed as accelerators, almost always in combination with an activator such as dibenzylamine. Known accelerators for use in rubber compositions include xanthates, usually in conjunction with an amine activator.

EP-A-0184301 discloses a composition, suitable for use as an accelerator in rubber curing processes, that comprises a mixture of two active components, i.e. a dihydrocarbyl xanthogen polysulphide and a xanthate selected from metal hydrocarbylxanthates and dihydrocarbylxanthates, at a respective weight ratio of 600:1 to 0.2:1. EP-A-0184301 also discloses vulcanisable compositions that comprise 100 parts by weight rubber; 1 to 6 parts by weight of a dihydrocarbyl xanthogen polysulphide; 0.01 to 5 parts by weight of a xanthate as defined above; sulphur; and less than 0.4 part by weight of nitrosatable materials (including compounds which are converted to nitrosatables under vulcanisation conditions).

A first object of the present invention is to reduce the environmental problems associated with commercial rubber processing and rubber products. A second object is to provide rubber compositions which cure satisfactorily in the presence of as little as possible (and preferably in the absence) of dangerous N-containing materials such as nitrosatables, including tertiary and, especially, secondary amines.

It has now been discovered that the addition of one or more dibenzylthiuram sulphides such as TBS compounds to either or both of the two active components described in EP-A-0184301 is desirable. In particular, the combination of the hydrocarbyl xanthogen polysulphide and TBS has unexpected advantages. The xanthate may also be present, and the xanthate and TBS may be combined as a commercial product, for addition to the dihydrocarbyl xanthogen polysulphide.

Combinations as described may be added to polymers to form a vulcanisable composition which can be vulcanised (e.g. as described in EP-A-0184301) to give any appropriate article. The processing safety and cure rate are unexpectedly increased, and the final state of cure enhanced. The final torque cure curve (rheometer) may be almost ideal for products such as moulded baby teats.

An article of the invention as defined above or obtained by vulcanisation in accordance with the invention may be shaped in a form intended for or adapted to skin contact. The article may be used by insertion into the mouth, for example, a mouthpiece for use in anaesthesia or oxygen supply in atmospheres of low or nil oxygen content, e.g. an underwater environment. The article may be a baby product such as a teat, soother or dummy. Further examples of articles of the invention (which may contact skin) are goggles, skin-diving suits, gloves (including surgical gloves), surgical rubbers, contraceptives, balloons and furnishings.

The article may be an automobile component, e.g. a tire. An article potentially of particular value is an aircraft tire, owing to the fact that the invention provide vulcanised natural rubber articles free or substantially free of undesirable nitrosatables during both manufacture and use, and also because reversion can be low or non-existent. In general, a vehicle may comprise an article of the invention, whether as a tire or as an item of furnishing.

The use of xanthogen polysulphide curing agents can generally obviate the need for secondary amine-based accelerators, but vulcanising agents based on dibenzylamine can be considered as precursors of N-nitrosodibenzylamine which has been shown to have very low carcinogenic activity when fed to rats (see Druckrey et al, supra).

The content of harmful nitrosatables in a composition or product of the invention is preferably as low as possible. Especially when natural rubber is used, the level of harmful material is preferably no more than 0.1, more preferably no more that 0.01 and most preferably no more than 0.001 ppm, with reference to either article or composition. By careful choice of constituents and reactants, an article of the invention can have such characteristics.

The use of N-containing materials other than those based on dibenzylamine, such as secondary and tertiary amines, is not inevitably excluded from the present invention; in certain circumstances, the use of such compounds appears to be necessary in order to provide a satisfactory degree of cure, especially when the rubber is a synthetic rubber. Nevertheless, the level of such materials, according to the present invention, is considerably lower than has previously been used commercially, and this represents a major technical advance. There is less than 0.4, preferably less than 0.3, more preferably less than 0.2, and most preferably less than 0.1, part nitrosatables. These FIGURES are expressed in parts by weight per 100 parts by weight of rubber.

The dibenzylthiuram sulphide used in the present invention is preferably a TBS but may also be a salt of the formula $M[-(S)_m-CS-N(Bz)_2]_n$ wherein Bz indicates benzyl, m is an integer, e.g. 1 or 2, and M is a metal such as zinc or another transition metal and n is its valency (preferably 2).

The present invention is based on the combined utility of the dibenzylthiuram sulphide and a dihydrocarbyl (by "hydrocarbyl", we include substituted hydrocarbyl) xanthogen polysulphides as rubber-curing agents. The xanthogen polysulphides may have the formula $R^1O-CS-S_x-CS-OR^2$ wherein $R^1$ and $R^2$ are the same or different and are each alkyl, cycloalkyl or N-free heterocyclic groups optionally substituted by substituents which either do not contain nitrogen or do not give rise to nitrosatable amines, and x is at least 2, and often greater than 2, e.g. 4 or 5. The maximum number of carbon atoms in $R^1$ or $R^2$, and preferably both, is usually about 20. $R^1$ and $R^2$ are preferably each $C_{1-6}$ alkyl and are usually the same, e.g. isopropyl.

A xanthogen polysulphide of the given formula can be prepared by reacting the corresponding xanthogen disulphide with sulphur or by reacting a xanthate salt, e.g. of the formula $R^1O-CS-S-Na$, with a sulphur halide, e.g. $S_2Cl_2$. It is known in the art that the products of these reactions are mixtures of compounds in which x is 3, 4, 5 or higher; when the product is analysed the value of x is not necessarily integral, but the components of the mixture can be separated at least partially by chromatographic techniques. x is often at least 3, e.g. about 4.

The amount of the curing agent as defined above, for vulcanisation, is usually at least 0.5 or 1, preferably at least 1.5, e.g. up to 4 or 6, and most preferably 2 to 4, parts by weight per 100 parts by weight of rubber. The curing agent can be formulated with rubber and any other conventional components which may be needed, to form a vulcanisable composition which is then vulcanised. The vulcanisable composition may include sulphur, e.g. in an amount of up to 2 parts by weight per 100 parts by weight of the rubber. The temperature of vulcanisation of a dry rubber composition is preferably at least 130° C., e.g. 140° to 180° C. The vulcanisation temperature is usually 35° to 100° C. for a latex. The composition may be formed, before, during or after curing, into a desired article, e.g. via an intermediate sheet form.

It is often desirable, on economic grounds, that the speed of vulcanisation of a cure system used in the invention should be increased by the use of activators. Activators which work satisfactorily with the curing agents of the invention are primary amines and also their sulphonated derivatives (sulphenamides), but it should be noted that sulphenamides are nitrosatable. A suitable primary amine has the formula $R^3NH_2$ wherein $R^3$ is as defined above for $R^1$.

As indicated in EP-A-0184301, xanthates are especially good activators for xanthogen polysulphides. Examples are dihydrocarbyl xanthates and metal hydrocarbylxanthates, e.g. of the formula $R^4O-CS-S-R^5$ wherein $R^4$ is of the same scope as $R^1$ and $R^5$ is a metal or a group of the same scope as $R^1$ (in the latter case, $R^4$ and $R^5$ may be different or, more often, the same); specific examples are zinc isopropylxanthate and dibutyl xanthate. The metal hydrocarbylxanthates are often preferred. The amount of xanthate with respect to rubber may be 0.01 to 5 pphr; it need be no more than 0.05 pphr.

The amount of TBS (often the disulphide) is preferably 0.1 to 1 or even 1.5, e.g. 0.2 to 0.7, parts per part dihydrocarbyl xanthogen polysulphide, e.g. diisopropyl xanthogen tetrasulphide. An amount less than 0.1 part has reduced effect; more than 1.5 part increases the likelihood of blooming. In a rubber/polymer composition, the loading of each of these components will not usually exceed 2.5 pphr, although the amounts given above may also be applicable.

The rubber which is used will be chosen as necessary. It may be in latex or dry form. Natural, Hypalon, SBR, neoprene, butyl, EPDM and nitrile rubbers may be used. Pre-cure and post-cure natural rubber latices are suitable for forming babies' bottle teats. Dry natural rubber or synthetic polyisoprene is preferred for moulded baby teats.

A composition of the invention may include conventional rubber processing additives and components such as fillers, processing aids and anti-oxidants. Carbon black, for example, may be used in an amount of 25 to 400 pphr. A conventional inorganic activator which may be used is zinc oxide. A conventional organic activator and processing acid which may be used is stearic acid. Another known processing aid which may be used comprises a paraffinic processing oil. An anti-oxidant should not be nitrosatable; a phenol such as 2, 2'-methylenebis[5-(1-methylcyclohexyl)-p-cresol]or Antioxidant 2246, i.e. 2, 2'-methylenebis(4-methyl-6-tert-butylphenol), can be used.

The following Examples 4 to 6, 8, 12 and 13 illustrate the invention. Examples 1 to 3, 7 and 9 to 11 are comparative. All amounts are in parts by weight. The following abbreviations are used:

| TMTD  | tetramethylthiuram disulphide |
| TBzTM | tetrabenzylthiuram monosulphide |
| TBzTD | tetrabenzylthiuram disulphide |
| DIXT  | diisopropyl xanthogen polysulphide (principally the tetrasulphide) |
| ZIX   | zinc isopropylxanthate |
| ZBeD  | zinc dibenzylthiuram disulphide |

EXAMPLES 1 TO 4 (SULPHER-FREE)

The following base mix was prepared in a 3A Banbury mixer:

| Natural rubber (SMR) | 100 |
| Zinc oxide | 5 |
| Stearic acid | 1 |
| Antioxidant (Nonox WSL) | 1 |
| Carbon black | 5 |
| CaCO$_3$ | 50 |

Portions of this were taken, and the following additions were made in a 2-roll mill:

| Example | 1 | 2 | 3 | 4 |
|---|---|---|---|---|
| TMTD  | 3.0 | — | — | — |
| TBzTD | — | 3.0 | — | 1.5 |
| DIXT  | — | — | 3.0 | 1.5 |

EXAMPLES 5 AND 6

Portions of the base mix used in Examples 1 to 4 were taken and, again in a 2-roll mill, 0.75 parts TBzTM (Ex. 5) or TBzTD (Ex. 6) were added in addition to 0.75 parts DIXT and 1.6 parts sulphur.

EXAMPLES 7 TO 13 (BABY TEAT FORMULATIONS)

The following base mix was prepared on a 406 mm (16 inch) 2-roll mill:

| Premasticated pale crepe | 100 |
| Antioxidant 2246 | 1.0 |
| Stearic acid | 0.8 |
| Zinc carbonate | 1.5 |
| Sulphur | 2.0 |

Portions were taken, and the following additions were made on the mill:

| Example | 7 | 8 | 9 | 10 | 11 | 12 | 13 |
|---|---|---|---|---|---|---|---|
| DIXT  | 1.5 | 1.5 | — | — | 1.5 | 1.5 | 1.5 |
| ZIX   | — | — | — | — | 0.016 | 0.016 | 0.016 |
| TBzTD | — | 0.5 | 0.5 | 1.5 | — | 0.5 | — |
| ZBeD  | — | — | — | — | — | — | 0.5 |

Rheological study of all the above formulations was carried out using a Monsanto Rheometer 100S linked to a data unit and a chart recorder.

Appropriate test pieces were moulded for tensile strength and elongation (before and after ageing), all to BS 903.

Mooney viscosities and scorch time determination were carried out at 120° C. by using a large rotor on a SPRI (Negretti Automation) pneumatically-operated Mooney Viscometer.

Physical tests (moduli at various elongations, tensile strength measurements and elongation at break) were carried out using a Lhomme and Argy tensile testing machine.

Ageing studies (ageing in air) were carried out in Wallace cell ovens for 70 hours at 100° C.

The results are tabulated below. In the Table, the following abbreviations apply:

| Vulcanisation Data: | |
|---|---|
| $T_{50}$ | time to 50% cure (min) |
| $T_{90}$ | time to 90% cure (min) |
| $M_H$ | maximum torque |
| $R_H$ | highest cure rate |
| Mooney Process Data at 120° C.: | |
| $t_5$ | time to 5 point rise (min) |
| $t_{10}$ | time to 10 point rise (min) |
| $t_{35}$ | time to 35 point rise (min) |
| Physical Properties before and after ageing: | |
| $T_b$ | tensile strength before ageing (MPa) |
| $E_b$ | elongation at break before ageing (%) |
| $\Delta T_b$ | tensile strength change after ageing (MPa) |
| $\Delta E$ | elongation change after ageing (%) |

Comparison of the $T_{50}/T_{90}$ data for Examples 1, 2 and 3 shows that, compared to TMTD, DIXT and, especially, TBzTD are poor accelerators in sulphur-free systems. However, the combinat-ion of TBzTD and DIXT (Example 4; total weight of accelerator still 3 pphr) gives similar results to those for TMTD, both as an accelerator and in the scorch data ($t_5$, $t_{10}$, $t_{35}$). The ageing characteristics for Example 4 are satisfactory. For the sulphur-containing formulations, Examples 5 and 6 show that when the monosulphide is tested alongside the disulphide, it shows comparable performance when both are used in conjunction with DIXT. For subsequent Examples, visual inspection of the rheographs show that the scorch time of the DIXT cure system (Example 7) is increased when TBzTD is included (Example 8) in the curative system. This is further supported by the Mooney process data at 120° C. The cure rate and maximum torque given by $R_H$ and $M_H$ respectively are also increased, indicating enhanced cross-linked density of the rubber. TBzTD alone (Examples 9, 10) is seen to be slow in curing, and can be classified as a relatively inactive accelerator. Combinations of DIXT and TBzTD (Example 8) produce vulcanisates of superior physical properties and good transparency, and are free from odour or taste. The ageing properties of the combination are relatively good.

Further, comparison of Examples 11, 12 and 13 shows that the scorch time given by the cure composition of a xanthogen polysulphide (DIXT) and a metal xanthate (ZIX), as in Example 11, is noticably reduced in the presence of ZBeD (Example 13) and increased in the presence of TBzTD (Example 12). This is strongly supported by the Mooney T process data at 120° C. $T_{90}$ is reduced with ZBeD and increased with TBzTD in the presence of a DIXT/ZIX/S cure composition. The tensile strength of a cure composition containing DIXT/ZIX/S (Example 12) in the presence of TBzTD increased with respect to Example 11 but, for ZBed (Example 13), a decrease was obtained. Therefore, the most useful "safe" accelerator which will improve the sulphur cross-links of rubber vulcanisates in the presence of DIXT/ZIX/S, and produce good physical properties, is TBzTD.

about 6 parts by weight dihydrocarbyl xanthogen polysulfide of the formula $R^1O\text{-}CS\text{-}S_x\text{-}SC\text{-}OR^2$ wherein $R^1$ and $R^2$ are the same or different and selected from the group consisting of alkyl, cycloalkyl and N-free heterocyclic groups and x is an integer of at least 2; from about 0 to about 5 parts by weight of a xanthate compound selected from the group consisting of dihydrocarbyl xanthates and metal hydrocarbylxanthates of the formula $R^4O\text{—}CS\text{—}S\text{—}R^5$ wherein $R^4$ is selected from the group consisting of alkyl, cycloalkyl and N-free heterocyclic groups and $R^5$ is selected from the group consisting of a metal and $R^4$; and less than 0.2 parts by weight of nitrosatable materials.

2. A composition according to claim 1, wherein the rubber is in latex form.

3. A compositon according to claim 1, which comprises from 0.5 to 4 parts by weight of said dihydrocarbyl xanthogen polysulfide.

4. A composition according to claim 3, which comprises from 2 to 4 parts by weight of said dihydrocarbyl xanthogen polysulfide.

5. A composition to claim 1, wherein said dibenzylthiuram sulfide is tetrabenzylthiuram monosulfide.

6. A composition according to claim 1, wherein said dibenzylthiuram sulfide is a dibenzylthiuram polysulfide.

7. A composition according to claim 6, wherein said dibenzylthiuram polysulfide is tetrabenzylthiuram disulfide.

8. A composition according to claim 1, which com-

TABLE

| Example | $T_{50}$ | $T_{90}$ | $M_H$ | $R_H$ | $t_5$ | $t_{10}$ | $t_{35}$ | $T_b$ | $E_b$ | $\Delta T_b$ | $\Delta E$ |
|---|---|---|---|---|---|---|---|---|---|---|---|
| 1 | 3.26 | 7.28 | 45.1 | 0.19 | 11 | 13 | 16 | 23.6 | 700 | −6.7 | −20 |
| 2 | 4.52 | 9.31 | 16.4 | 0.04 | 21 | 25 | 31 | 8.3 | 840 | −6.6 | −95 |
| 3 | 2.34 | 4.52 | 27.4 | 0.19 | 9 | 10 | 11 | 14.7 | 890 | −14.7 | −240 |
| 4 | 3.27 | 6.21 | 38.8 | 0.4 | 11 | 13 | 16 | 21.3 | 750 | −11.6 | −55 |
| 5 | 3.03 | 3.24 | 31.9 | 0.75 | — | — | — | — | — | — | — |
| 6 | 3.06 | 3.28 | 21.8 | 0.68 | — | — | — | — | — | — | — |
| 7 | 4.39 | 5.31 | 33.0 | 0.34 | 12.5 | 13 | — | 12.6 | 920 | −5.8 | −20 |
| 8 | 5.54 | 6.46 | 41.4 | 0.43 | 13 | 14 | — | 18 | 840 | −0.3 | −340 |
| 9 | 9.08 | 11.58 | 30.0 | 0.09 | 26.5 | 30 | — | 11.6 | 950 | −1.4 | −310 |
| 10 | 8.47 | 10.35 | 38.1 | 0.14 | 22 | 24.5 | — | 14.9 | 850 | −1.8 | −300 |
| 11 | 3.0 | 3.2 | 40.8 | 1.05 | 10.25 | 10.5 | — | 20.3 | 850 | −1.6 | −50 |
| 12 | 3.4 | 4.0 | 47.6 | 1.34 | 14.5 | 15 | — | 21.9 | 750 | −2.9 | −110 |
| 13 | 2.09 | 2.33 | 47.3 | 1.28 | 5.5 | 6 | — | 15.5 | 760 | −3.8 | −160 |

What is claimed is:

1. A sulfur free vulcanizable composition which comprises 100 part by weight rubber and accelerators consisting essentially of a dibenzylthiuram sulfide in an amount up to about 1.5 parts by weight, from about 1 to prises 0.1 to 1 part by weight of said dibenzylthiuram sulfide per part by weight of said dihydrocarbyl xanthogen polysulfide.

* * * * *